US010128062B2

(12) United States Patent
Towers

(10) Patent No.: US 10,128,062 B2
(45) Date of Patent: Nov. 13, 2018

(54) STRAIN GAUGE PROPORTIONAL PUSH BUTTON

(71) Applicant: Eaton Corporation, Cleveland, OH (US)

(72) Inventor: Kevin Christopher Towers, Fort Langley (CA)

(73) Assignee: Eaton Intelligent Power Limited, Dublin (IE)

(*) Notice: Subject to any disclaimer, the term of this patent is extended or adjusted under 35 U.S.C. 154(b) by 114 days.

(21) Appl. No.: 14/985,579

(22) Filed: Dec. 31, 2015

(65) Prior Publication Data

US 2017/0194114 A1 Jul. 6, 2017

(51) Int. Cl.
*H02N 1/00* (2006.01)
*H01H 13/14* (2006.01)

(52) U.S. Cl.
CPC ....... *H01H 13/14* (2013.01); *H01H 2215/008* (2013.01); *H01H 2239/052* (2013.01)

(58) Field of Classification Search
CPC ............. H01H 13/14; H01H 2215/008; H01H 2239/052; H01H 2003/00; H01H 2003/02; H01H 2003/12; H01H 2215/00; H01H 2215/004; H01H 2215/034; H01H 13/00; H01H 13/04; H01H 13/26; H01H 13/50; H01H 13/54; H01H 13/70; H01H 13/7006; H01H 13/702; H01H 13/705; H01H 13/78; H01H 3/00; H01H 3/12; H01H 5/00; H01H 5/04
USPC .................. 200/5 A, 400, 402, 406; 310/309
See application file for complete search history.

(56) References Cited

U.S. PATENT DOCUMENTS 4,268,728 A * 5/1981 Rose .................... H01H 15/005 200/16 D
4,296,406 A 10/1981 Pearson
4,462,018 A * 7/1984 Yang ..................... G01L 19/148 338/3
4,644,315 A 2/1987 Hodges
5,136,131 A 8/1992 Komaki
5,270,710 A 12/1993 Gaultier et al.
5,489,900 A 2/1996 Cali et al.
5,510,784 A 4/1996 Polaert et al.
(Continued)

FOREIGN PATENT DOCUMENTS

WO 2015047616 A1 4/2015

*Primary Examiner* — Anthony R. Jimenez
(74) *Attorney, Agent, or Firm* — Ziolkowski Patent Solutions Group, SC

(57) ABSTRACT

A transmitter device incorporating a strain gauge proportional push button is disclosed. The transmitter device includes a printed circuit board including one or more electrical components thereon and a proportional push button having a flexible membrane, a dome switch positioned beneath the flexible membrane and attached to the printed circuit board, the dome switch being proximate to the flexible membrane such that depression of the flexible membrane causes the dome switch to snap down and thereby form a closed circuit in the dome switch, and a strain gauge formed on or applied to the printed circuit board and positioned adjacent the dome switch, the strain gauge generating an electrical output proportional to an amount of deflection of the printed circuit board caused by pressure exerted thereon by depression of the flexible membrane and the dome switch.

21 Claims, 5 Drawing Sheets

(56) References Cited

U.S. PATENT DOCUMENTS

| | | | | |
|---|---|---|---|---|
| 5,675,329 | A | 10/1997 | Barker et al. | |
| 6,243,077 | B1 * | 6/2001 | Manara | G06F 3/0213 345/157 |
| 6,331,849 | B1 | 12/2001 | VandenBoom | |
| 6,822,584 | B2 | 11/2004 | Scheib | |
| 2001/0003326 | A1 | 6/2001 | Okada et al. | |
| 2003/0160712 | A1 * | 8/2003 | Levy | H01H 13/702 341/22 |
| 2004/0234072 | A1 * | 11/2004 | Hirai | H01H 13/7006 379/422 |
| 2006/0090022 | A1 | 4/2006 | Flynn et al. | |
| 2007/0119698 | A1 * | 5/2007 | Day | G06F 3/038 200/510 |
| 2009/0266699 | A1 | 10/2009 | Rothkopf et al. | |
| 2011/0241442 | A1 | 10/2011 | Mittleman et al. | |
| 2013/0141342 | A1 | 6/2013 | Bokma et al. | |
| 2015/0296607 | A1 | 10/2015 | Yang et al. | |

* cited by examiner

STRAIN GAUGE PROPORTIONAL PUSH BUTTON

BACKGROUND OF THE INVENTION

Embodiments of the invention relate generally to proportional push buttons and, more particularly, to a strain gauge proportional push button.

Remote controls for controlling machinery or devices by radio frequency generally consist of a remote hand-held transmitter which can be a push button panel, a console, or other type of transmitter according to the application, where said transmitter is partly managed by an operator, through which said operator can remotely provide instructions to the machine or device. The transmitters may incorporate a plurality of mechanisms—including push buttons, rotary buttons, selector switches, joysticks or levers—each of which has a different function. As an example, a transmitter for use with an off-road vehicle or equipment may incorporate a plurality of mechanisms to control a crane, winch, etc. on the vehicle/equipment.

With respect to push buttons included on the remote control, it is recognized that such push buttons may be in the form of proportional pushbuttons that generate a range of values depending on how hard the push button is pressed. This allows an operator to, for example, increase the speed of the controlled axis on the equipment (e.g., crane) by pressing harder on the push button. Most proportional push buttons on remote control transmitters have a long range of travel, such as greater than ½", for example. For proportional push buttons that are included as part of a remote transmitter, the buttons are sealed and protected from the environment—with a flexible rubber seal typically providing protection for the push button over its range of travel.

While long range proportional push buttons as described above are effective for controlling their associated machinery/device, it is recognized that the standard construction of these buttons has drawbacks and limitations associated therewith. For example, as the rubber seal of a long range push button is required to flex long distances, the rate of wear of the seal (and the switch in general) is increased. Additionally, the long range push button and its seal have to be physically larger for mechanical strength and flexibility, such that the size/footprint of the button on the remote control is increased. Further, it is more costly to create a mechanically robust push button that has a longer range of travel.

It would therefore be desirable to provide a proportional push button that overcomes the aforementioned drawbacks of increased wear, size and cost associated with existing long range proportional push buttons.

BRIEF DESCRIPTION OF THE INVENTION

Embodiments of the invention are directed to a strain gauge proportional push button for use in a transmitter device.

According to an aspect of the invention, a transmitter device includes a printed circuit board including one or more electrical components thereon and a proportional push button having a flexible membrane, a dome switch positioned beneath the flexible membrane and attached to the printed circuit board, the dome switch being proximate to the flexible membrane such that depression of the flexible membrane causes the dome switch to snap down and thereby form a closed circuit in the dome switch, and a strain gauge formed on or applied to the printed circuit board and positioned adjacent the dome switch, the strain gauge generating an electrical output proportional to an amount of deflection of the printed circuit board caused by pressure exerted thereon by depression of the flexible membrane and the dome switch.

According to another aspect of the invention, a proportional push button for use on a transmitter device includes a flexible button membrane and a snap-action dome switch positioned beneath the flexible membrane and attached to a printed circuit board, the snap-action dome switch being proximate to the flexible membrane such that depression of the flexible membrane causes the a movable member of the snap-action dome switch to collapse and thereby form a closed circuit in the dome switch. The proportional push button also includes a strain gauge structure formed on or applied to the printed circuit board and positioned adjacent the dome switch, the strain gauge structure generating an electrical output proportional to an amount of deflection of the printed circuit board, with the deflection of the printed circuit board being caused by pressure exerted thereon by depression of the flexible membrane and the snap-action dome switch.

According to yet another aspect of the invention, a transmitter device includes a printed circuit board and a plurality of proportional push buttons positioned on and adjacent to the printed circuit board. Each of the plurality of proportional push buttons further includes a flexible membrane, a dome switch positioned beneath the flexible membrane and attached to the printed circuit board proximate to the flexible membrane such that depression of the flexible membrane causes the dome switch to snap down and thereby form a closed circuit in the dome switch, and a strain gauge structure positioned adjacent the dome switch and configured to generate an electrical output proportional to an amount of deflection of the printed circuit board caused by pressure exerted thereon by depression of the flexible membrane and the dome switch. The strain gauge structure further includes an arrangement of strain gauge resistors and push button monitoring circuitry in operable communication with the arrangement of strain gauge resistors to process electrical output therefrom. The printed circuit board includes an arrangement of slots formed therein adjacent each strain gauge structure, with each arrangement of slots at least partially surrounding the arrangement of strain gauge resistors of a respective strain gauge structure to isolate the strain gauge structure from a strain gauge structure of any adjacent proportional push buttons.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a strain gauge proportional push button. The proportional push button includes a dome switch mounted on a printed circuit, with a strain gauge being provided on the printed circuit that measures the force applied to the circuit board.

While embodiments of the invention are described below as being implemented in a remote hand-held transmitter device (i.e., a "remote control") used to control machinery or devices, it is recognized that strain gauge proportional push buttons could be employed on numerous other systems or devices. Accordingly, embodiments of the invention should be understood to not be limited to the specific implementations and embodiments described herein, and it is recognized that other systems or devices that employ strain gauge proportional push buttons are considered to be within the scope of the invention.

Figure 1:
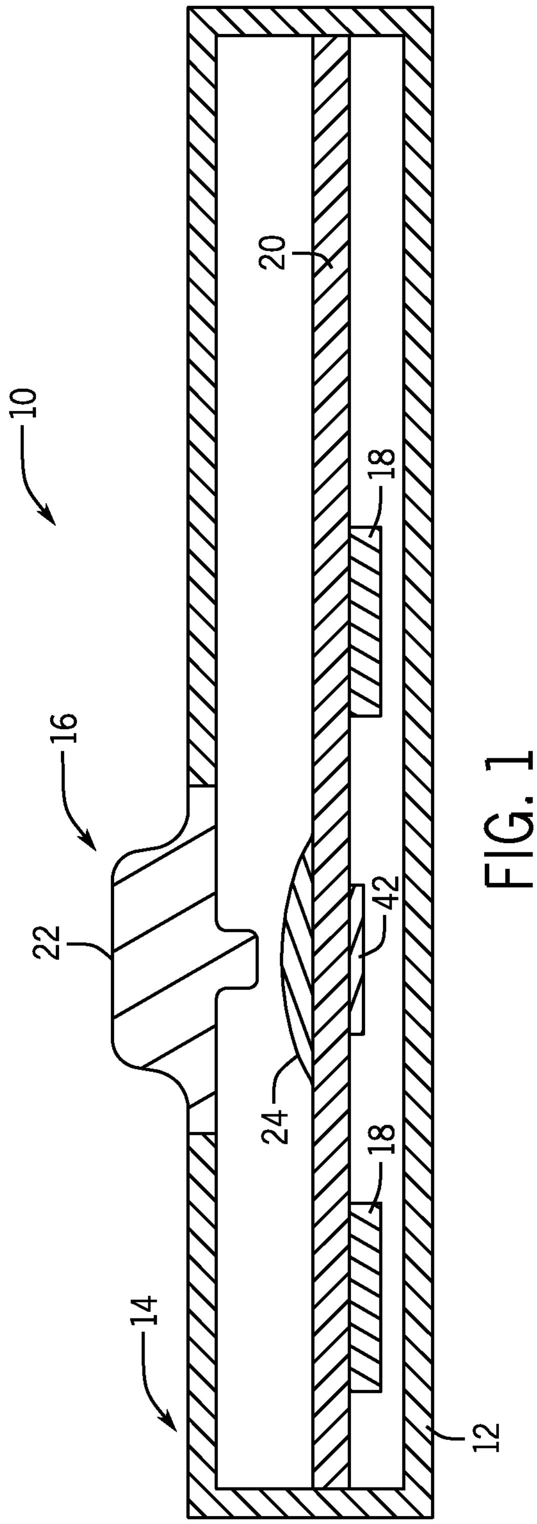
FIG. 1 is a cross-sectional side view of an illustrative remote control device including a proportional push button, in accordance with an embodiment of the invention.

Referring to FIG. 1, a cross-sectional view of a remote hand-held transmitter device or "remote control" 10 is shown according to an embodiment of the invention. The remote control 10 includes an outer housing 12 having a front surface 14 on which one or more control mechanisms 16 are provided for controlling machinery or devices distant from the remote control 10. For purposes of clarity, only a single control mechanism 16 is illustrated in FIG. 1, but it is recognized that an arrangement of such mechanisms may be provided on remote control 10.

The remote control 10 also includes components 18 that are mounted on a printed circuit board 20 positioned within the outer housing. The printed circuit board 20 may be formed of one or more layers of dielectric material and one or more layers of metal traces (not shown) and may be a rigid printed circuit board or a flexible printed circuit board. Components 18 may be, for example, integrated circuits, discrete components such as capacitors, resistors, and inductors, switches, connectors, sensors, RF transmitters, input-output devices such as status indicators lights, audio components, or other electrical and/or mechanical components for the remote control 10. Components 18 may be attached to printed circuit board 20 using solder, welds, anisotropic conductive film or other conductive adhesives, or other conductive connections. One or more layers of patterned metal interconnects (i.e., copper traces or metal traces formed from other materials) may be formed within one or more dielectric layers in printed circuit board 20 to form signal lines that route signals between components 18.

As shown in FIG. 1, control mechanism 16 is structured as a push button that, according to embodiments of the invention, operates as a proportional push button 16 that generates a range of values depending on how hard the pushbutton is pressed. The push button 16 includes an upper flexible membrane 22, such as a molded rubber button component, that extends out past the front surface 14 of the outer housing 12. A dome switch 24 of the push button 16 is positioned beneath the flexible membrane 22 and within the outer housing 12, with the dome switch 24 being positioned such that a pressing of the flexible membrane causes a deformation of the dome switch 24.

Figure 2:
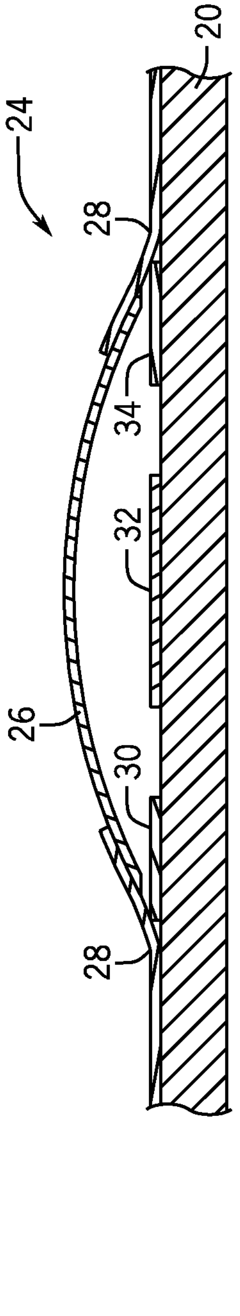
FIG. 2 is a sectional view of an illustrative dome switch useable with the proportional push button of FIG. 1, in accordance with an embodiment of the invention.

An exemplary construction of the dome switch 24 is illustrated in FIG. 2, according to an embodiment of the invention, although it is recognized that the exact construction of the dome switch 24 may vary in some regards. As shown in FIG. 2, the dome switch 24 comprises a springy metal dome member 26, such as a stainless sheet or phosphorus bronze sheet, an adhesive membrane or tape layer 28 that is positioned about the dome member 26 to hold the dome member in place, and an arrangement of conductive metal traces or contacts 30, 32, 34 (e.g., copper traces) formed on the printed circuit board 20, between which electrical connection is effected upon operation of the push button 16. When the top of the dome member 26 is depressed, the dome member is moved down so as to make contact with traces 30, 34 to provide an electrical connection therebetween, thereby forming a closed electrical circuit and enabling a signal generation indicating that the push button 16 has been depressed to an On position.

Referring back now to FIG. 1, it is further shown that remote control 10 includes a strain gauge structure 42 formed in/on the printed circuit board 20 or attached thereto that forms part of the push button 16. The strain gauge 42 may be based on a network of resistors formed of an appropriate material (e.g., copper, nickel, etc.), with a Wheatstone bridge circuit or other strain gauge circuit being used in measuring small resistance changes within the stain gauge resistors. The strain gauge 42 is positioned adjacent (i.e., beneath) dome switch 24 such that, when an operator presses on the upper flexible membrane 22 to snap down the dome switch 24 and thereby complete the circuit between electrical contacts 30, 34 (FIG. 2), the strain gauge 42 is able to measure any additional force applied by the operator to the button 16 and produce a proportional signal that may be output from remote control 10 to operate an associated device or machinery.

Figure 3:
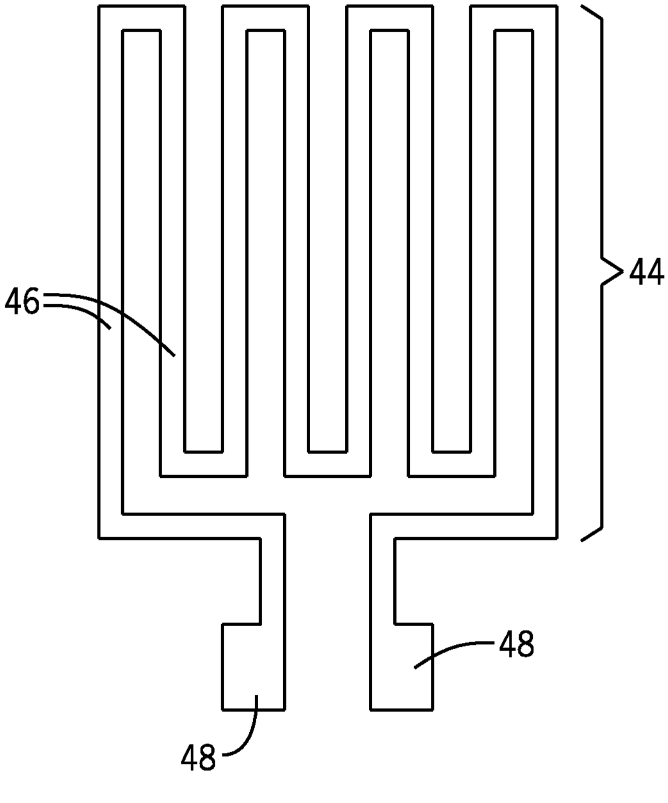
FIG. 3 is a top view of an illustrative strain gauge resistor useable with the proportional push button of FIG. 1, in accordance with an embodiment of the invention.

An illustrative strain gauge resistor configuration that may be used for strain gauge 42 is shown in FIG. 3. As shown in FIG. 3, strain gauge resistor 44 may include metal traces patterned to form multiple parallel elongated metal strips in a single meandering path 46 coupled between a pair of resistor terminals 48. When upper flexible membrane 22 and dome switch 24—and therefore printed circuit board 20—are subjected to stress (e.g., by bending inwardly in response to the application of force by a user finger), the resistance across terminals 48 will change. This change in resistance may be measured using strain gauge resistor monitoring circuitry such as a bridge circuit or other strain gauge circuitry.

Figure 4:
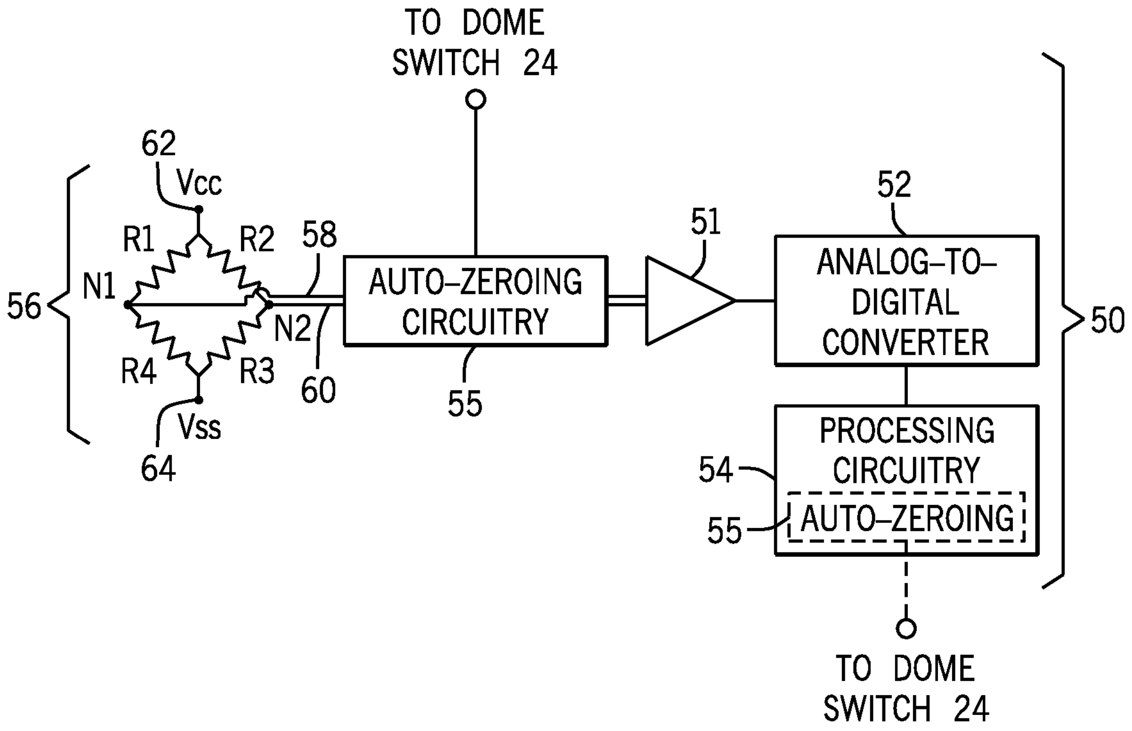
FIG. 4 is a circuit diagram of illustrative strain gauge circuitry that forms a strain gauge in the proportional push button of FIG. 1, in accordance with an embodiment of the invention.

Illustrative push button monitoring circuitry 50 that may be used in making strain gauge measurements for strain gauge 42 of push button 16 is shown in FIG. 4. As shown in FIG. 4, push button monitoring circuitry 50 may include strain gauge resistors R1, R2, R3, and R4. One or more of strain gauge resistors R1, R2, R3, and R4 may be implemented using a meandering trace pattern of the type used by strain gauge resistor 44 of FIG. 3.

Push button monitoring circuitry 50 may include an amplifier 51, an analog-to-digital (A/D) converter 52 and processing circuitry 54—with processing circuitry being in the form of a microprocessor running software that interprets the A/D converter output. In an exemplary embodiment, auto-zeroing circuitry 55 is also included in push button monitoring circuitry 50 that performs an auto-zeroing of the applied force to the push button 16, as will be explained in greater detail below. While auto-zeroing circuitry 55 is shown in FIG. 4 as being separate from processing circuitry 54, it is recognized that the auto-zeroing circuitry 55 could be incorporated into processing circuitry 54 according to another embodiment of the invention (e.g., as software in processing circuitry 54 that performs auto-zeroing), as shown in phantom in FIG. 4. Circuitry components 51, 52, 54, 55 may be coupled to a bridge circuit 56 that is formed from resistors R1, R2, R3, and R4 using signal paths 58 and 60. A power supply (not shown) may provide a power supply voltage Vcc to bridge circuit terminal 62 of bridge circuit 56 and may provide a power supply voltage Vss to bridge circuit terminal 64 of bridge circuit 56. Power supply voltages Vcc and Vss may be, for example, a positive power supply voltage and a ground power supply voltage, respectively.

During operation of push button monitoring circuitry 50, a voltage drop of Vcc−Vss will be applied across bridge circuit 56. Resistors R1, R2, R3, and R4 may all nominally have the same resistance value (as an example). In this configuration, bridge circuit 56 will serve as a voltage divider that nominally provides each of paths 58 and 60 with a voltage of (Vcc−Vss)/2. The voltage difference across nodes N1 and N2 will therefore initially be zero.

With one suitable arrangement, resistors R1 and R3 are mounted in a flexible printed circuit 20 so that both resistors R1 and R3 will experience similar stresses during use. Resistors R2 and R4 may be located away from resistors R1 and R3 and/or may be oriented so as to avoid being stressed while resistors R1 and R3 are being stressed. This allows resistors R2 and R4 to serve as reference resistors. With this approach, pressure to the strain gauge resistors R1 and R3 in flexible printed circuit 20 from a user finger will cause the resistance of resistors R1 and R3 to rise simultaneously while resistors R2 and R4 serve as nominally fixed reference resistors (compensating for drift, temperature changes, etc.). Because both R1 and R3 respond to the application of pressure, amplifier 51 and analog-to-digital converter 52 will receive a larger signal than a configuration in which only one of the strain gauge resistors in bridge circuit 56 response to the application of pressure. This is because the voltage on path 58 will drop due to the increase in the resistance of resistor R1 while the voltage on path 60 simultaneously rises due to the increase in the resistance of resistor R3. Other types of bridge circuit layouts may be used if desired.

Due to the changes in resistance to resistors R1 and R3, the voltage between paths 58 and 60 will vary in proportion to the strain that is being applied to the strain gauge structure 42. Amplifier 51 amplifies the voltage signal across paths 58 and 60, while analog-to-digital converter 52 digitizes the amplified voltage signal and provides corresponding digital strain (stress) data to processing circuitry 54. Processing circuitry 54 and other control circuitry in remote control 10 can take appropriate action in response to the measured strain data. For example, processing circuitry 54 can convert raw strain data into button press data or other button input information. Remote control 10 can then respond accordingly to generate a desired signal/output (e.g., by using the strain gauge button data as data for generating an RF control signal for transmission to a remotely controlled device/machine, etc.).

Figure 5:
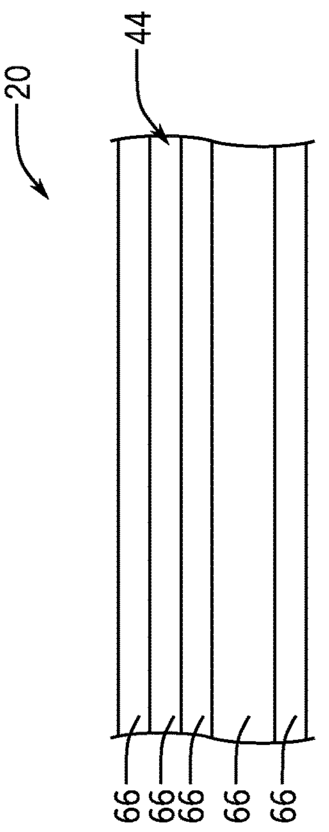
FIG. 5 is a cross-sectional side view of a flexible printed circuit board useable with the remote control device of FIG. 1, in accordance with an embodiment of the invention.

As indicated above, the strain gauge 42 (or more accurately resistors 44) may be formed in/on the printed circuit board 20 or attached thereto. In an embodiment where the strain gauge resistors 44 are attached to the printed circuit board 20, the strain gauge resistors 44 may be applied using traditional techniques. In an embodiment where the strain gauge resistors 44 are formed in/on the printed circuit board 20, the resistors 44 can be printed directly on the printed circuit board 20 or formed as part of a layer within the circuit board—with the integral forming of the strain gauge resistors 44 with the printed circuit board 20 conserving space within the remote control 10 and improving performance and reducing complexity thereof. When the strain gauge resistors 44 are formed integrally with the printed circuit board 20, the printed circuit board may be formed of multiple layers of material, as illustrated in FIG. 5, with the layers 66 including one or more dielectric layers, layers of metal traces used to form signal paths to interconnect the circuitry of remote control 10, and one or more adhesive layers (or no adhesive layers). Examples of metals that may be used in the metal layers in the flexible printed circuit 20 include copper, nickel, gold, and aluminum. Examples of dielectric materials that may be used in forming the dielectric layers in the flexible printed circuit 20 include polyimide, acrylic, and other polymers. Examples of adhesives that may be used in forming the adhesive layers in the flexible printed circuit 20 include acrylic adhesives and epoxy adhesives. The strain gauge resistors 44 may be formed as a layer 66 within the printed circuit board 20 or printed on a top surface thereof, with the strain gauge resistors 44 being formed of a desired resistor metal and patterned appropriately to form strain gauge resistors, such as to have a structure as illustrated in FIG. 3, for example.

In operation of the remote control 10, and of the proportional push button 16 thereon, an operator depresses upper flexible membrane 22 such that it comes in contact with the dome switch 24 and causes a deformation or snapping down of the dome switch 24. The snapping down of the dome switch 24 closes the circuit in the push button 16 and causes an electrical signal to be generated (via the dome member 26 coming in contact with the electrical contacts/traces 30, 34 to provide an electrical connection, as in FIG. 2) that gives a positive indication that the operator has manually activated the push button 16.

When the circuit is closed responsive to the dome switch 24 being snapped down/closed, an auto-zeroing of the applied force to the push button 16 is initiated by auto-zeroing circuitry 55—with the dome switch 24 being in operable communication with the auto-zeroing circuitry 55 to enable such auto-zeroing (e.g., wired to the auto-zeroing circuitry 55, either as separate circuitry or incorporated in processing circuitry 54). The auto-zeroing step is performed by comparing a known amount of force required to collapse to the dome switch 24 to the actual force applied to the dome switch 24 to collapse the dome switch 24 in the present depression of the push button 16. The difference between these force values can then be determined to perform the auto-zeroing. Beneficially, the auto-zeroing allows for changes in the resistive elements 44 of strain gauge 42 that might be due to temperature and other environmental factors to be to be accounted for and nulled out of the force equation employed with the strain gauge 42 in determining the force applied thereto, such that the proportional output of the remote control 10 is then determined by how much force the operator continues to apply to the push button 16. For force that is continued to be applied to the push button 16 (to upper flexible membrane 22 and dome switch 24), stress/bending imparted to the printed circuit board 20 is measured by strain gauge 42—with a change in resistance within the stain gauge resistors 44 being measured using strain gauge resistor monitoring circuitry 50, as shown and described in FIGS. 3 and 4, in order to generate a proportional output that is amplified and converted (A/D conversion) to provide an output signal to be transmitted by remote control 10 to control operation of an associated device or machinery.

In an exemplary embodiment, in generating a proportional output via push button 16, a maximum proportional value can be determined by having the operator calibrate the maximum amount of force he is willing to apply to the push button 16. This maximum force is measured and stored permanently in the remote control 10 (e.g., in processing circuitry 54) during the calibration process. It is then used to scale the proportional output based on these calibrated values.

Figure 6:
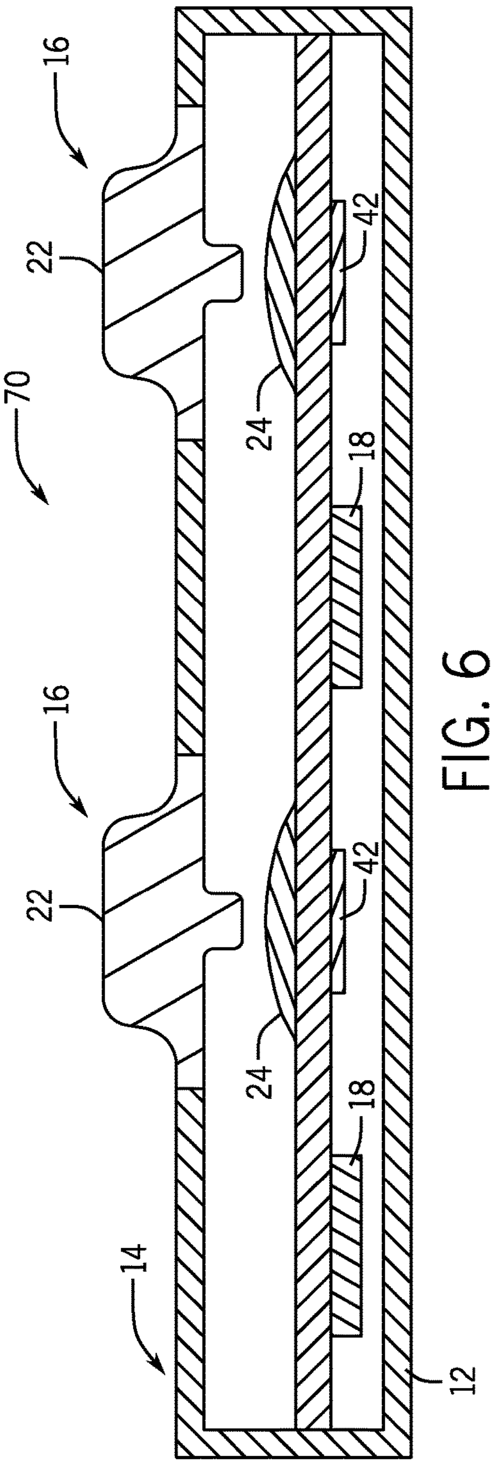
FIG. 6 is a cross-sectional side view of an illustrative remote control device including multiple proportional push buttons, in accordance with an embodiment of the invention.
Figure 7:
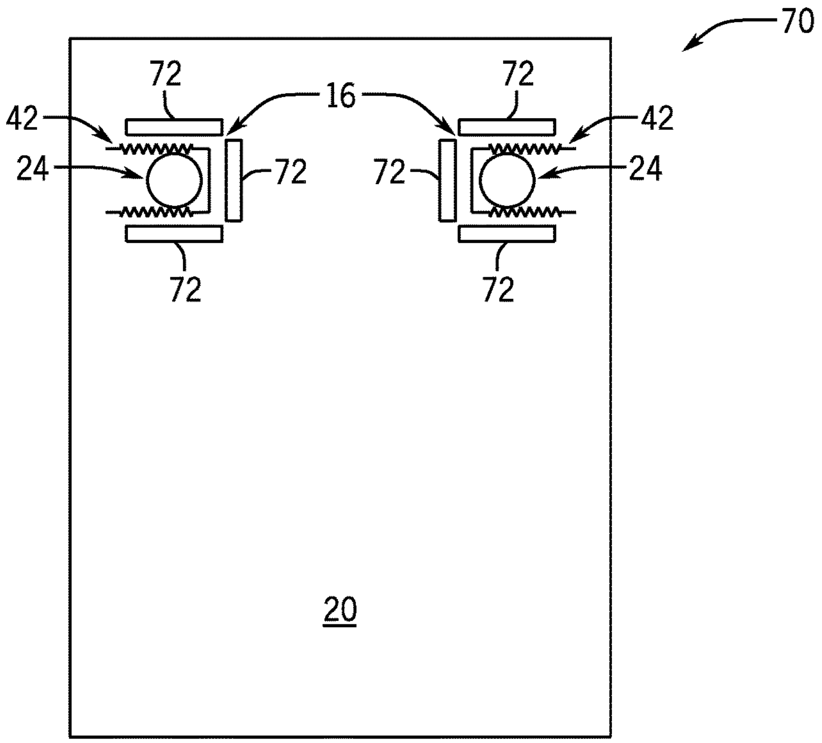
FIG. 7 is a top sectioned view of the remote control device of FIG. 6, in accordance with an embodiment of the invention.

While the remote control 10 of FIG. 1 is shown and described as included only a single push button 16 thereon, it is recognized that remote controls may include numerous proportional push buttons thereon that are separably operable to control distinct devices. Referring now to FIGS. 6 and 7, views of a remote control 70 that include multiple proportional push buttons 16 thereon are provided according to an embodiment of the invention. The remote control 70 is shown as including two push buttons 16 thereon, but it is recognized that up to sixteen push buttons, for example, could be included on the remote control 70. The structure of each push button 16 is identical to that shown and described in FIGS. 1-4, and thus a detailed description of such structure is not repeated here below. However, it is recognized that the inclusion of multiple push buttons 16 in the remote control 70 can potentially lead to force interactions from one push button to another push button when multiple push buttons are pressed at the same time. That is, when a push button 16 has force applied to it, the printed circuit board 20 will be flexed under the push button 16 and, when multiple push buttons are pressed simultaneously, this flex in the printed circuit board 20 associated with the pressing of each push button can be detected on adjacent push button strain gauges 42 in some instances.

In order to minimize the force interactions from one push button 16 to another push button 16 during operation of the remote control 70, an exemplary embodiment of the remote control 70 includes a printed circuit board 20 having a plurality of slots or cutouts 72 formed therein adjacent each of the push buttons 16. As shown in FIG. 7, a plurality of slots 72 are formed in the printed circuit board 20 adjacent each push button 16, with such slots 72 at least partially surrounding the strain gauge 42 for each push button 16. The slots 72 function to remove or absorb the force caused by the movements of the domed members 24 and printed circuit board 20 and eliminate any influence on the adjacent strain gauges 42. The size, number and shape of the slots 72 may vary according to a desired control range, and thus while an arrangement of three rectangular slots 72 is shown formed in the printed circuit board 20 about each strain gauge 42, it is recognized that other combinations of the size, number and shape of the slots 72 are considered within the scope of the invention.

Figure 8:
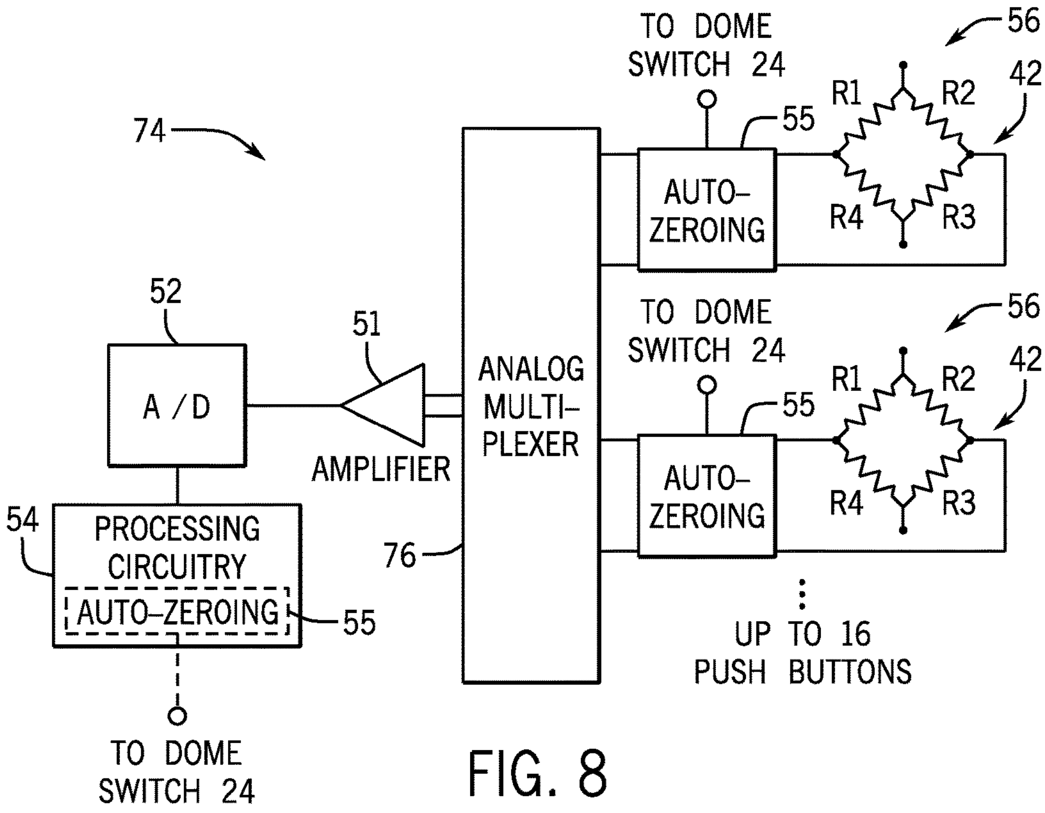
FIG. 8 is a circuit diagram of illustrative strain gauge circuitry that forms strain gauges in the proportional push buttons of FIG. 6, in accordance with an embodiment of the invention.

Referring now to FIG. 8, push button monitoring circuitry (stress data collection circuitry) 74 that may be used in making strain gauge measurements for the strain gauge 42 of each push button 16 is shown. The push button monitoring circuitry 74 is similar to that of the push button monitoring circuitry 50 shown and described in FIG. 4, in that it includes strain gauge resistors R1, R2, R3, and R4 forming bridge circuit 56, amplifier 51, an analog-to-digital converter 52, processing circuitry 54 (e.g., a microprocessor), and auto-zeroing circuitry 55 (separate from processing circuitry 54 or incorporated thereon as software). However, in order to provide for receiving/processing strain data from multiple strain gauges 42, the push button monitoring circuitry 74 additionally includes an analog multiplexer 76 that provides for the output of multiple strain gauges 42 to be provided to amplifier 51, analog-to-digital converter 52 and processing circuitry 54. In operation, the processing circuitry 54 continuously cycles through all strain gauges 42 (of push buttons 16) on the remote control 70, reading measurements from each one (i.e., from the snapping down of dome switch 24 and from strain gauge 42) in turn.

Beneficially, embodiments of the invention thus provide a strain gauge proportional push button that overcomes the drawbacks of increased wear, size and cost associated with existing long range proportional push buttons. The strain gauge proportional push button makes use of a snap-action dome button/switch and strain gauge sensor to enable detection of when the push button is actuated on and a detection of further force/pressure subsequent to activation of the switch. An auto-zeroing feature of the push button beneficially allows for changes in resistive elements of strain gauge that might be due to temperature and other environmental factors to be to be accounted for and nulled out prior to stress/strain detection.

Therefore, according to an embodiment of the invention, a transmitter device includes a printed circuit board including one or more electrical components thereon and a proportional push button having a flexible membrane, a dome switch positioned beneath the flexible membrane and attached to the printed circuit board, the dome switch being proximate to the flexible membrane such that depression of the flexible membrane causes the dome switch to snap down and thereby form a closed circuit in the dome switch, and a strain gauge formed on or applied to the printed circuit board and positioned adjacent the dome switch, the strain gauge generating an electrical output proportional to an amount of deflection of the printed circuit board caused by pressure exerted thereon by depression of the flexible membrane and the dome switch.

According to another embodiment of the invention, a proportional push button for use on a transmitter device includes a flexible button membrane and a snap-action dome switch positioned beneath the flexible membrane and attached to a printed circuit board, the snap-action dome switch being proximate to the flexible membrane such that depression of the flexible membrane causes the a movable member of the snap-action dome switch to collapse and thereby form a closed circuit in the dome switch. The proportional push button also includes a strain gauge structure formed on or applied to the printed circuit board and positioned adjacent the dome switch, the strain gauge structure generating an electrical output proportional to an amount of deflection of the printed circuit board, with the deflection of the printed circuit board being caused by pressure exerted thereon by depression of the flexible membrane and the snap-action dome switch.

According to yet another embodiment of the invention, a transmitter device includes a printed circuit board and a plurality of proportional push buttons positioned on and adjacent to the printed circuit board. Each of the plurality of proportional push buttons further includes a flexible membrane, a dome switch positioned beneath the flexible membrane and attached to the printed circuit board proximate to the flexible membrane such that depression of the flexible membrane causes the dome switch to snap down and thereby form a closed circuit in the dome switch, and a strain gauge structure positioned adjacent the dome switch and configured to generate an electrical output proportional to an amount of deflection of the printed circuit board caused by pressure exerted thereon by depression of the flexible membrane and the dome switch. The strain gauge structure further includes an arrangement of strain gauge resistors and push button monitoring circuitry in operable communication with the arrangement of strain gauge resistors to process electrical output therefrom. The printed circuit board includes an arrangement of slots formed therein adjacent each strain gauge structure, with each arrangement of slots at least partially surrounding the arrangement of strain gauge resistors of a respective strain gauge structure to isolate the strain gauge structure from a strain gauge structure of any adjacent proportional push buttons.

Embodiments of the present invention have been described in terms of the preferred embodiment, and it is recognized that equivalents, alternatives, and modifications, aside from those expressly stated, are possible and within the scope of the appending claims.

What is claimed is:

1. A transmitter device comprising:
- a printed circuit board including one or more electrical components thereon; and
- a proportional push button comprising:
  - a flexible membrane;
  - a dome switch positioned beneath the flexible membrane and attached to the printed circuit board, the dome switch being proximate to the flexible membrane such that depression of the flexible membrane causes the dome switch to snap down and thereby form a closed circuit in the dome switch; and
  - a strain gauge formed on or applied to the printed circuit board and positioned adjacent the dome switch, the strain gauge generating an electrical output proportional to an amount of deflection of the printed circuit board caused by pressure exerted thereon by depression of the flexible membrane and the dome switch.

2. The transmitter device of claim 1 wherein the dome switch comprises:
- a metal dome member having a snap-action movement;
- an adhesive membrane or tape layer positioned about the metal dome member to hold the metal dome member in place; and
- an arrangement of conductive metal traces or contacts formed on the printed circuit board between which electrical connection is effected upon a snapping down of the metal dome member.

3. The transmitter device of claim 1 wherein the transmitter device comprises a remote hand-held transmitter.

4. The transmitter device of claim 1 wherein the strain gauge is positioned adjacent the dome switch on a side thereof opposite from the flexible membrane.

5. The transmitter device of claim 1 wherein the strain gauge comprises an arrangement of strain gauge resistors; and
- wherein the transmitter device further comprises push button monitoring circuitry in operable communication with the strain gauge resistors via signal paths, the push button monitoring circuitry configured to:
  - convert analog voltage signals received from signal paths that are proportional to a strain that is applied to the arrangement of strain gauge resistors to digital strain data; and
  - process the digital strain data to generate a desired output.

6. The transmitter device of claim 5 wherein the push button monitoring circuitry is further configured to:
- determine when a closed circuit is formed in the dome switch responsive to the dome switch being snapped down via the flexible membrane; and
- perform an auto-zeroing operation of an applied force causing the dome switch to snap down, such that the electrical output of the strain gauge is proportional only to any additional force applied to the push button beyond that applied to snap down the dome switch.

7. The transmitter device of claim 5 wherein the printed circuit board comprises a flexible printed circuit board having the arrangement of strain gauge resistors formed as part of a layer or layers therein.

8. The transmitter device of claim 5 wherein the push button monitoring circuitry is further configured to:
- correlate a maximum proportional value that may be output from the proportional push button with a maximum pressure level applied to the proportional push button; and
- scale the proportional electrical output generated by the strain gauge based on the correlation between the maximum proportional value and the maximum pressure level.

9. The transmitter device of claim 8 wherein the push button monitoring circuitry is further configured to correlate the maximum proportional value that may be output from the proportional push button with the maximum pressure level applied to the proportional push button via a calibration process performed thereby.

10. The transmitter device of claim 5 wherein the proportional push button comprises a first proportional push button, and wherein the transmitter device further comprises one or more additional proportional push buttons.

11. The transmitter device of claim 10 wherein the printed circuit board comprises a plurality of slots formed therein adjacent the strain gauge of each of the first proportional push button and the one or more additional proportional push buttons, the plurality of slots at least partially surrounding each respective strain gauge; and
- wherein the plurality of slots interrupt force interactions between the first and second proportional push buttons resulting from deflection of the printed circuit board.

12. The transmitter device of claim 10 wherein the push button monitoring circuitry comprises a multiplexer configured to control a forwarding of analog voltage signals from the strain gauge of each of the first and second proportional push buttons for analog-to-digital conversion and processing.

13. A proportional push button for use on a transmitter device, the proportional push button comprising:
- a flexible button membrane;
- a snap-action dome switch positioned beneath the flexible membrane and attached to a printed circuit board, the snap-action dome switch being proximate to the flexible membrane such that depression of the flexible membrane causes a movable member of the snap-action dome switch to collapse and thereby form a closed circuit in the dome switch; and
- a strain gauge structure formed on or applied to the printed circuit board and positioned adjacent the dome switch, the strain gauge structure generating an electrical output proportional to an amount of deflection of the printed circuit board, with the deflection of the printed circuit board being caused by pressure exerted thereon by depression of the flexible membrane and the snap-action dome switch.

14. The proportional push button of claim 13 further comprising:

an arrangement of strain gauge resistors; and push button monitoring circuitry in operable communication with the arrangement of strain gauge resistors, the push button monitoring circuitry configured to generate an electrical output proportional to an amount of deflection of the printed circuit board.

15. The proportional push button of claim 14 wherein the push button monitoring circuitry is configured to:

determine when a closed circuit is formed in the snap-action dome switch responsive to the dome switch being collapsed; and perform an auto-zeroing of the strain gauge structure, such that the electrical output of the strain gauge structure is proportional only to any additional force applied to the push button beyond that applied to collapse the snap-action dome switch.

16. The proportional push button of claim 14 wherein the push button monitoring circuitry is configured to:

correlate a maximum proportional value that may be output from the proportional push button with a maximum pressure level applied to the proportional push button; and scale the proportional electrical output generated by the strain gauge based on the correlation between the maximum proportional value and the maximum pressure level.

17. The proportional push button of claim 14 wherein the printed circuit board comprises a flexible printed circuit board having the arrangement of strain gauge resistors formed as part of a layer or layers therein.

18. The proportional push button of claim 14 wherein the printed circuit board comprises a plurality of slots formed therein that at least partially surround the arrangement of strain gauge resistors, the plurality of slots isolating the strain gauge structure from a strain gauge structure of any adjacent proportional push buttons that are formed on the same printed circuit board.

19. A transmitter device comprising:

a printed circuit board; and a plurality of proportional push buttons positioned on and adjacent to the printed circuit board, each of the plurality of proportional push buttons comprising:

a flexible membrane;

a dome switch positioned beneath the flexible membrane and attached to the printed circuit board, the dome switch being proximate to the flexible membrane such that depression of the flexible membrane causes the dome switch to snap down and thereby form a closed circuit in the dome switch;

a strain gauge structure positioned adjacent the dome switch and configured to generate an electrical output proportional to an amount of deflection of the printed circuit board caused by pressure exerted thereon by depression of the flexible membrane and the dome switch, the strain gauge structure comprising an arrangement of strain gauge resistors; and push button monitoring circuitry in operable communication with the arrangement of strain gauge resistors to process electrical output therefrom;

wherein the printed circuit board comprises an arrangement of slots formed therein adjacent each strain gauge structure, with each arrangement of slots at least partially surrounding the arrangement of strain gauge resistors of a respective strain gauge structure to isolate the strain gauge structure from a strain gauge structure of any adjacent proportional push buttons.

20. The transmitter device of claim 19 wherein the push button monitoring circuitry is configured to:

determine when a closed circuit is formed in the dome switch responsive to the dome switch being snapped down; and perform an auto-zeroing of the strain gauge structure, such that the electrical output of the strain gauge structure is proportional only to any additional force applied to the proportional push button beyond that applied to snap down the dome switch.

21. The transmitter device of claim 19 wherein the push button monitoring circuitry is configured to:

correlate a maximum proportional value that may be output from the proportional push button with a maximum pressure level applied to the proportional push button; and scale the proportional electrical output generated by the strain gauge based on the correlation between the maximum proportional value and the maximum pressure level.

* * * * *